United States Patent [19]

Oh et al.

[11] Patent Number: 5,761,366

[45] Date of Patent: Jun. 2, 1998

[54] OPTICAL FIBER WITH SMOOTH CORE REFRACTIVE INDEX PROFILE AND METHOD OF FABRICATION

[75] Inventors: Seung-Hun Oh; Young-Sik Yoon, both of Gumi, Rep. of Korea

[73] Assignee: Samsung Electronics Co., Ltd., Suwon, Rep. of Korea

[21] Appl. No.: 745,123

[22] Filed: Nov. 7, 1996

[30] Foreign Application Priority Data

Nov. 7, 1995 [KR] Rep. of Korea ............... 1995-40089

[51] Int. Cl.$^6$ .............................. G02B 6/02; C03B 37/023
[52] U.S. Cl. .......................... 385/127; 385/123; 385/124; 385/126; 385/142; 385/144; 65/385; 65/415
[58] Field of Search ............................ 385/123, 124, 385/126, 127, 128, 141, 142, 144; 65/385, 403, 404, 405, 413, 414, 415

[56] References Cited

U.S. PATENT DOCUMENTS

| | | | |
|---|---|---|---|
| 4,242,118 | 12/1980 | Irven | 65/382 X |
| 4,265,515 | 5/1981 | Kao | 385/127 X |
| 4,412,722 | 11/1983 | Carnevale et al. | 385/124 X |
| 4,516,826 | 5/1985 | Paek | 385/124 X |
| 4,568,370 | 2/1986 | Powers | 65/3.11 |
| 4,641,917 | 2/1987 | Glodis et al. | 385/127 X |
| 4,715,679 | 12/1987 | Bhagavatula | 385/127 X |
| 4,737,179 | 4/1988 | Tanaka et al. | 65/3.12 |
| 4,755,022 | 7/1988 | Ohashi et al. | 385/127 X |
| 4,822,399 | 4/1989 | Kanamori et al. | 65/3.12 |
| 5,518,516 | 5/1996 | Garnham | 65/382 |
| 5,555,340 | 9/1996 | Onishi et al. | 385/127 |
| 5,558,693 | 9/1996 | Sarker | 65/382 |
| 5,613,027 | 3/1997 | Bhagavatula | 385/123 |

OTHER PUBLICATIONS

*Optoelectronic Technology and Lightwave Communications System*, Lin, Chinlon, 1989, pp. 4–7, 98–109, no month.
*Fiber Optic Communications Handbook*, Tosco, Federico, 1990, pp. 78–92, no month.
*Fiber Optic Communications*, Palais, Joseph C., 1992 (third edition), pp. 126–130, no month.
*Fiber Optic Communication Systems*, Agrawal, Govind P. 1997 (second edition), pp. 64–68, no month.
*Optical Fiber Telecommunications II*, Miller, Stewart E. et al., 1988, pp. 29–37, pp. 154–181, no month.
*Optical Fiber Communications*, Li, Tingye, 1985, pp. 1–65, pp. 97–165, no month.
"Segmented–Core Single–Mode Fiber Optimized for Bending Performance", *Journal of Lightwave Technology*, Lapp, J.C. et al., Oct. 1988, pp. 462–465.
"Fracture Origins of Fibers Fabricated by Hybridized Process", *Journal of Lightwave Technology*, Yoshida et al., Nov. 1996, pp. 2506–2512.
"The VAD Preform Stretching Process: A Numerical Model for Evaluation of Internal Distortion", *Journal of Lightwave Technology*, Clark, Harold R. et al., Aug. 1986, p. 1039–1047.
"Design and Perfromance of Gaussian–Prolfile Dispersion–Shifted Fibers Manufactured by VAD Process", *Journal of Lightwave Technology*, Yamauchi et al., Aug. 1986, pp. 997–1004.
*Electronics Letters*, Sep. 1982, pp. 842–844.
"Triangular–Profile Single–Mode Fiber", *Optics Letters*, Saifi et al., Jan. 1982, pp. 43–45.

*Primary Examiner*—Brian Healy
*Attorney, Agent, or Firm*—Robert E. Bushnell, Esq.

[57] ABSTRACT

A method of fabricating a dispersion shifted optical fiber with a smooth annular ring refractive index profile has the steps of heating a quartz tube with an external oxygen or hydrogen burner and supplying the quartz tube with raw materials including $SiCl_4$, $GeCl_4$, $POCl_3$ and $CF_4$. $O_2$ is later supplied. Then, the quartz tube is heated in nine passes of decreasing temperature from 1920° C. to 1890° C., so as to deposit a core section. In the nine passes, the quantity of $SiCl_4$ feed flow decreases from 380 milligrams per minute to 260 milligrams per minute, the quantity of $GeCl_4$ feed flow increases from 20 milligrams per minute to 195 milligrams per minute, and the quantity of $O_2$ feed flow is kept constant at 1500 cubic centimeters per minute.

54 Claims, 10 Drawing Sheets

OPTICAL FIBER WITH SMOOTH CORE REFRACTIVE INDEX PROFILE AND METHOD OF FABRICATION

CLAIM OF PRIORITY

This application makes claims all benefits accruing under 35 U.S.C. §119 from an application for *Method of Fabricating Dispersion Shifted Optical Fiber With Smooth Annular Ring Refractive Index Profile* earlier filed in the Korean Industrial Property Office on 7 Nov. 1995 and there duly assigned Ser. No. 40089/1995.

BACKGROUND OF THE INVENTION

1. Field of the Invention

The present invention relates to a dispersion shifted optical fiber and, more particularly, to a dispersion shifted optical fiber having an annular ring refractive index profile around a core, and its fabricating method.

2. Description of the Related Art

A dispersion shifted optical fiber of contemporary practice, such as the ubiquitous 1.55 μm fiber for high speed networks of information, is of many kinds and characteristics. These kinds and characteristics of the dispersion shifted optical fibers are described in detail in a reference *Optical Fiber Telecommunication II* published in Academic Press, Inc., pages 29 to 36, which is incorporated by reference into this specification. Among the dispersion shifted optical fibers, the dispersion shifted optical fiber with an annular ring refractive index profile is especially well-known for its excellence in handling micro bending loss. An optical fiber of this structure was introduced by Mr. Bhagavatula and his coworkers in 1983, and discussed by others, such as in Carnevale et al. (U.S. Pat. No. 4,412,722, *Single Mode Fiber With Graded Index of Refraction*, Nov. 1, 1983) and in Paek (U.S. Pat. No. 4,516,826, *Single Mode Lightguide Fiber Having A Trapezoidal Refractive Index Profile*, May 14, 1985). Mr. Bhagavatula and his coworkers reported that this optical fiber has a layer having a low annular ring refractive index around the core, such that the layer protects the core. This optical fiber is fabricated mainly by OVD(Outside Vapor Deposition Method) and MCVD(Modified Chemical Vapor Deposition). Neither the OVD nor the MVCD is problem-free. As for OVD, while the OVD makes it easy to fabricate an optical fiber of a structure having a triangle annular ring profile or to fabricate a porous structure having a relatively large outside diameter of a base material to some degree, it is difficult to fabricate an optical fiber of a structure having a step-like annular ring refractive index profile as disclosed in Bhagavatula (U.S. Pat. No. 4,715,679, *Low Dispersion, Low-Loss Single-Mode Optical Waveguide*, Dec. 29, 1987), KR26410 and KR49509.

While the MCVD process makes it easy to fabricate an optical fiber of any desired profile through an uniform flow controlled by inside deposition, the modified chemical vapor deposition process has not been able to produce an optical fiber having a large outside diameter of base material. Vapor phase axial deposition (VAD) processes, as are discussed in Tanaka et al. (U.S. Pat. No. 4,737,179, *Method For Producing Glass Preform For Optical Fibers*, Apr. 12, 1988), in Ohashi et al. (U.S. Pat. No. 4,755,022, *Zero Dispersion Single Mode Optical Fiber With Center Core And Side Core In The 1.5 μM Wavelength Region*, Jul. 5, 1988), and in Kanamori et al. (U.S. Pat. No. 4,822,399, *Glass Preform For Dispersion Shifted Single Mode Optical Fiber And Method For The Production Of The Same*, Apr. 18, 1989) provide an alternative to MCVD.

From my study of those exemplars of the art and other contemporary practices, I have found that there is a need for an effective method for fabricating a dispersion shifted optical fiber having an annular ring refractive index profile formed around a core. Some of the other exemplars of the contemporary practice include Garnham (U.S. Pat. No. 5,518,516, *Method of Forming an Optical Fibers Preform* May 21, 1996) which describes a method of forming an optical fiber preform from which an optical fiber can be drawn, in which successive layers of matter are deposited by vapor deposition on a rotating cylindrical body. The cylindrical body is traversed by a heat source. The method is to address the problem of ripples formed during an OTDR (optical time domain reflectometry). Sarkar (U.S. Pat. No. 5,558,693, *Methods of Making Optical Waveguides*, Sep. 24, 1996) teaches a method of making optical waveguides in which a core cylinder is built up axially by relative movement of between a soot stream and target during a deposition. The movement is kept non-constant in order to maintain a substantially constant diameter with a constant deposition rate. Irven (U.S. Pat. No. 4,242,118, *Optical Fiber Manufacture*, Dec. 30, 1980) teaches a method for making an optical fiber solid rod preform in which a vapor reaction deposit process is used to form a localized deposit on an end face of a rod or disc. The reaction is progressively changed to cause the deposit building up on the end face to have a radially graded refractive index profile. Powers (U.S. Pat. No. 4,569,370, *Optical Fiber Preform and Method*, Feb. 4, 1986) discusses a method of forming a porous glass optical waveguide preform by varying speeds of burners. The layers formed by the completion of a single traverse by both burners combine to form a conically-shaped layer. None of these or any other exemplars of the contemporary practice seems to address a need for an effective fabricating method of a dispersion shifted optical fiber having an annular ring refractive index profile around a core, such as having the deposition process of the core with the multiple passes as in one of the embodiments of the present invention or having the other features of the present invention.

SUMMARY OF THE INVENTION

Accordingly, an object of the present invention is to provide an improved dispersion shifted optical fiber.

Another object of the present invention is to provide an improved dispersion shifted optical fiber having an annular ring refractive index profile around a core.

Another object of the present invention is to provide an improved fabricating method of a dispersion shifted optical fiber.

Another object of the present invention is to provide a improved fabricating method of a dispersion shifted optical fiber having an annular ring refractive index profile around a core.

Another object of the present invention is to provide an improved dispersion shifted optical fiber having an annular ring refractive index profile around a core, being lower than a core.

Another object of the present invention is to provide a fabricating method of a dispersion shifted optical fiber having an annular ring refractive index profile around a core. In this method, a geometric structure in the state of the optical fiber is made uniform by smoothing the refractive index through a Modified Chemical Vapor Deposition method in which a chemical gas is injected into a quartz tube and heated with an external burner for the purpose of deposition.

Another object of the present invention is to provide a method of inducing a non-rippling refractive index by regulating a deposition temperature and amounts of deposition feed flows in a deposition of a base material, and reducing a center dip by adding a designated amount of $SF_6$ and $CF_4$ to $GeO_2$ which is volatile in the center of the core at a high temperature during a collapse of the base material.

Another object of the present invention is to provide a method of making a core diameter to be uniform by increasing the outer diameter of the base material.

To accomplish one or more of the above objects, a method of fabricating a dispersion shifted optical fiber with a smooth annular ring refractive index profile according to the present invention comprises the steps of heating a quartz tube with an external oxygen or hydrogen burner from 1875° C. to 1903° C. To deposit a first clad, the quartz tube is supplied with raw materials including 5200 milligrams per minute of $SiCl_4$, 430 milligrams per minute of $GeCl_4$, 30 milligrams per minute of $POCl_3$ and 9 cubic centimeters per minute of $CF_4$. To deposit an annular ring section, raw materials are supplied, including 3300 milligrams per minute of $SiCl_4$, 1150 milligrams per minute of $GeCl_4$, 20 milligrams per minute of $POCl_3$ and 1500 cubic centimeters per minute of $O_2$ at a constant temperature of 1900° C., so as to deposit an annular ring section. To deposit a second clad, raw materials are supplied, including 3800 milligrams per minute of $SiCl_4$, 430 milligrams per minute of $GeCl_4$, 10 milligrams per minute of $POCl_3$ and 7 cubic centimeters per minute of $CF_4$ with increasing the temperature from 1890° C. to 1897° C. To deposit a core section, heating occurs in nine passes of decreasing temperature from 1920° C. to 1890° C. (with nine different temperatures T1, T2, T3, . . . T9 as in Tables 1, 2, and 3 below) so as to deposit a core section. In the nine passes, the quantity of $SiCl_4$ feed flow decreases from 380 milligrams per minute to 260 milligrams per minute, the quantity of $GeCl_4$ feed flow increases from 20 milligrams per minute to 195 milligrams per minute, and the quantity of $O_2$ feed flow is kept constant at 1500 cubic centimeters per minute. The deposition-finished optical fiber is condensed at 2300° to 2360° C. 30 to 40 cubic centimeters per minute of $CF_4$ are added to the quartz tube. Etching occurs at 2220° to 2250° C. 100 cubic centimeters per minute of $Cl_2$ are added to the quartz tube at 2350° to 2370° C. for the purposes of sealing and closing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
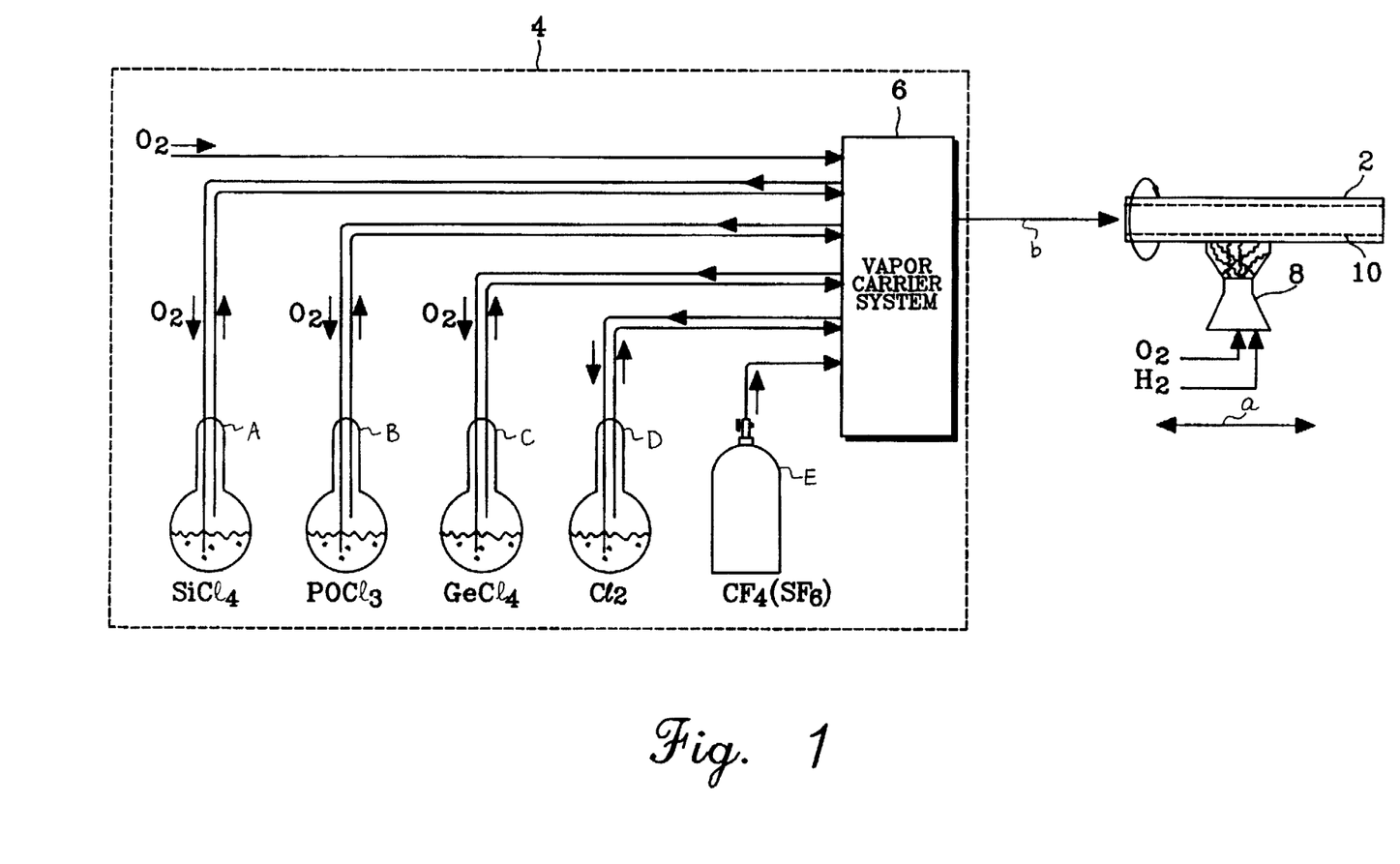
FIG. 1 is a schematic view of a fabricating process according to a Modified Chemical Vapor Deposition.

Turing now to the drawings, FIG. 2 and FIGS. 3A–3F, in conjunction with the system shown FIG. 1, show a fabricating process of an optical fiber. A constant amount of raw material gas is supplied from a raw material gas supply system to a quartz tube 2. The quartz tube 2 is heated with a burner 8 at a constant temperature so as to fabricate a dispersion shifted optical fiber having an annular ring refractive index profile. The burner 8 is moved along the length of the quartz tube 2 in both directions ("traverse directions") of the arrow a. In the fabricating method illustrated in FIG. 2 and FIGS. 3A–3F, before the deposition of a first clad layer, the quartz tube 2 is heated for a designated time to the surface temperature (at surface 10 of the quartz tube 2) of 1890° C., so as to have the inside of the quartz tube to be uniform. The surface temperature is read by a pyrometer. The surface 10 is the inner surface of the quartz tube 2 or the inner surface of the deposited layer of the quartz tube 2. The quartz tube 2 is continuously heated with an external oxygen or hydrogen burner 8 at 1890° C. while supplying 5400 milligrams per minute of $SiCl_4$ from container A, 450 milligrams per minute of $GeCl_4$ from container C, 40 milligrams per minute of $POCl_3$ from container B, and 12 cubic centimeters per minute of $CF_4$ from container E, as noted in FIGS. 3B to 3F. Raw material gases are sent to a vapor carrier system 6, then moved to the quartz tube 2 along the direction of arrow b. After this, the quartz tube 2 is supplied with 3000 milligrams per minute of $SiCl_4$, 1300 milligrams per minute of $GeCl_4$, 35 milligrams per minute of $POCl_3$ and 2000 cubic centimeters per minute of $O_2$ and heated uniformly up to 1905° C. for the purpose of deposition so as to form an annular ring section as in FIG. 3A. Then, the quartz tube is supplied with 4000 milligrams per minute of $SiCl_4$, 450 milligrams per minute of $GeCl_4$, 25 milligrams per minute of $POCl_3$ and 9 cubic centimeters per minute of $CF_4$ and heated uniformly to 1915° C. for the purpose of formation of a second clad layer, as in FIG. 3A. In addition to this, 1100 milligrams per minute of $SiCl_4$ and 2000 milligrams per minute of $O_2$, are provided to the quartz tube and $GeCl_4$ is added up to 60 to 250 milligrams per minute with heating the tube uniformly at 1910° C. for the purpose of the deposition of a core section. The deposition-finished quartz tube is condensed at 2300° to 2320° C., and 30 to 40 cubic centimeters per minute of $CF_4$ is added to the condensed culture tube. Finally, it is etched at 2220° to 2250° C., heated to 2340° to 2360° C., and tightly sealed and closed as in FIG. 3A.

Figure 6:
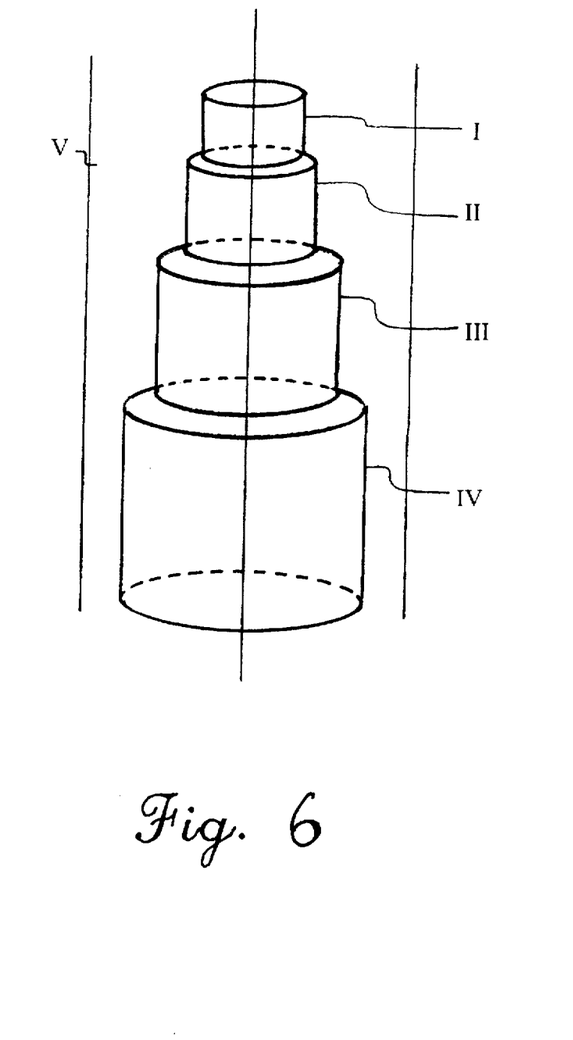
FIG. 6 illustrates an optical fiber having the layers as in the present invention.

The result is illustrated at FIG. 6. The resulting optical fiber fabrication process, which began with a quartz tube V, now has a core section I, a second clad layer II, an annular ring III, and a first clad layer IV.

The base material of the dispersion shifted optical fiber with an annular ring profile as described above has a circular cone refractive index in its core. In order to have the maximum refractive index in the center of the core, the amount of $GeO_2$ has to be increased towards the center of the core. A method that has increasing amounts of $GeO_2$ has a problem of center dip which is a phenomenon of decreasing refractive index in the center of the core in a Modified Chemical Vapor Deposition method. The method may induce a phenomenon of decreasing refractive index in the center of core section.

Figure 2:
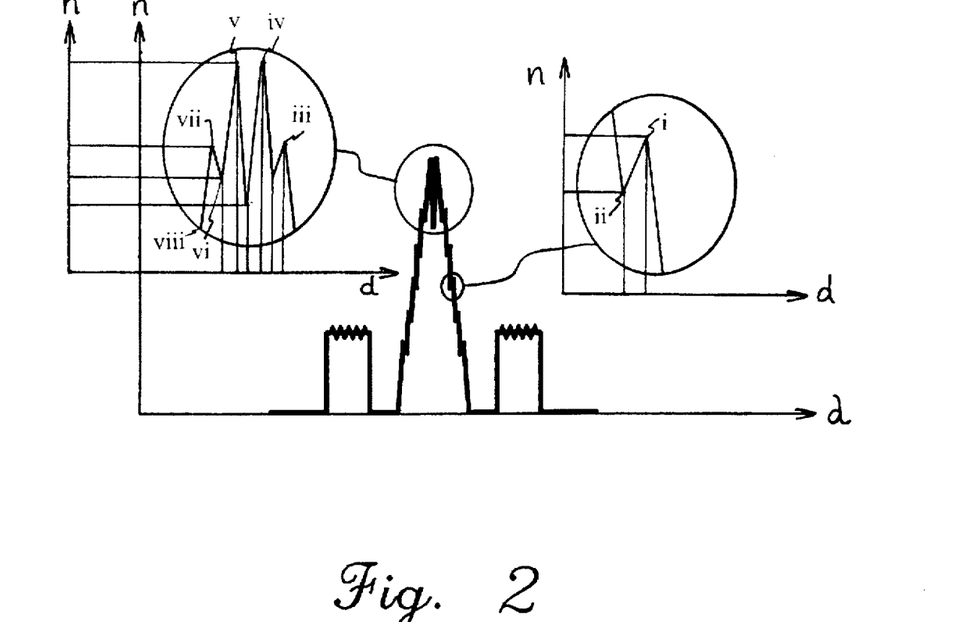
FIG. 2 is a refractive index profile of a first optical fiber, the fabricating process done according to a contemporary practice.
Figure 3A:
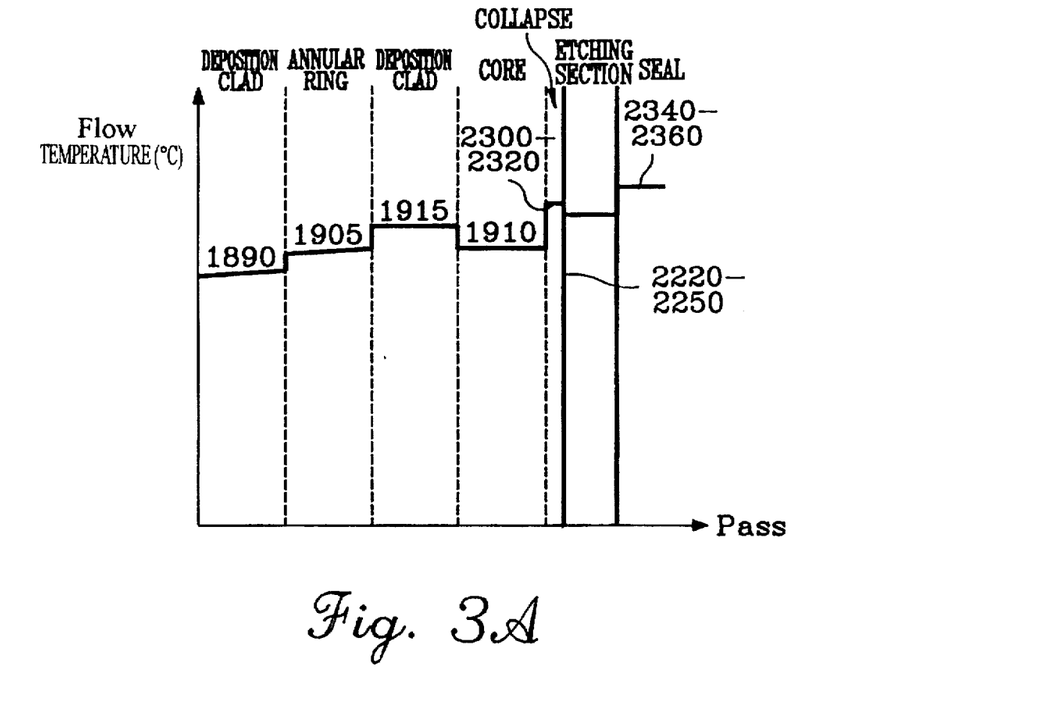
FIG. 3A shows heating temperatures in a fabricating process of the first optical fiber having a refractive index profile as in FIG. 2, the fabricating process done according to a contemporary practice.
Figure 3B:
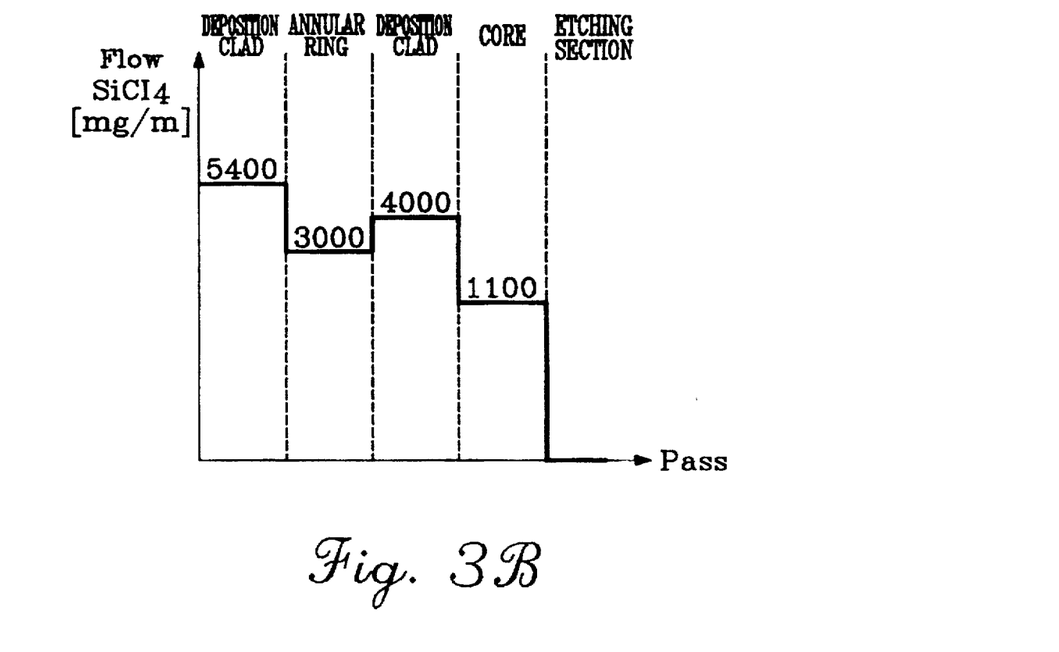
FIG. 3B shows a feed flow of $SiCl_4$ in a fabricating process of the first optical fiber having a refractive index profile of FIG. 3A.
Figure 3C:
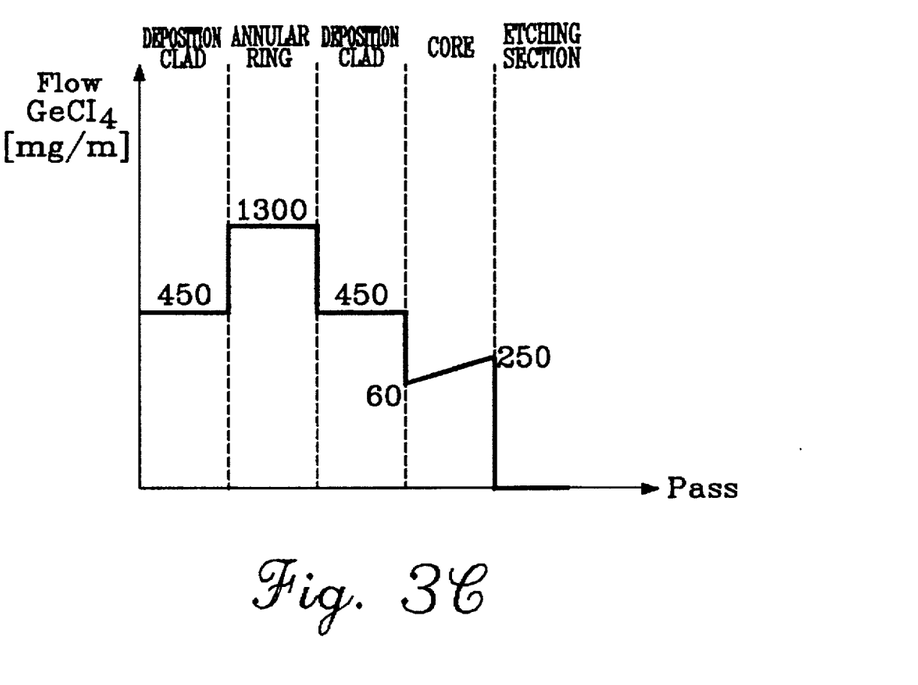
FIG. 3C shows a feed flow of $GeCl_4$ in a fabricating process of the first optical fiber having a refractive index profile of FIG. 3A.
Figure 3D:
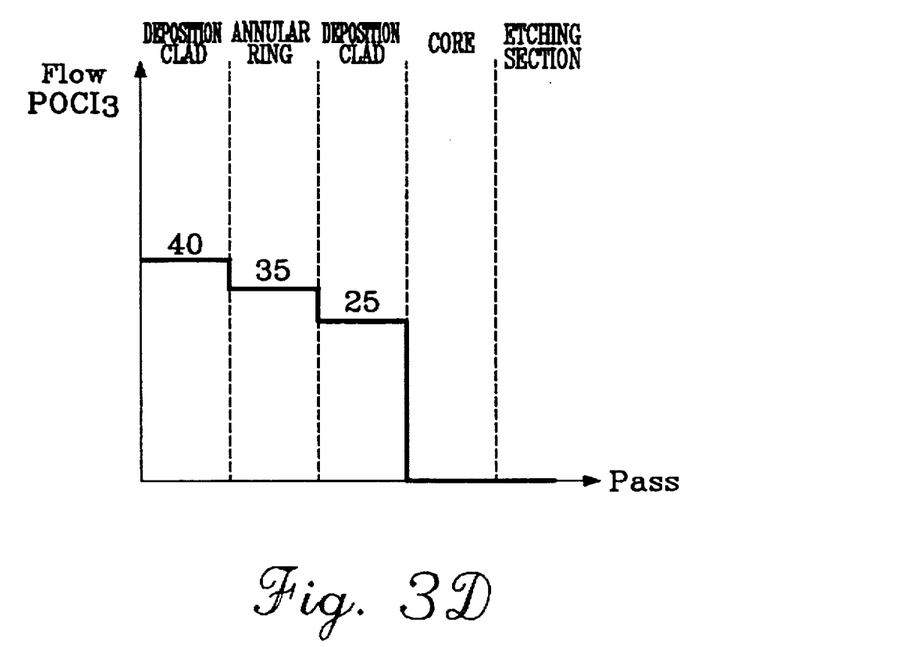
FIG. 3D shows a feed flow of $POCl_3$ in a fabrication process of the first optical fiber having a refractive index profile of FIG. 3A.
Figure 3E:
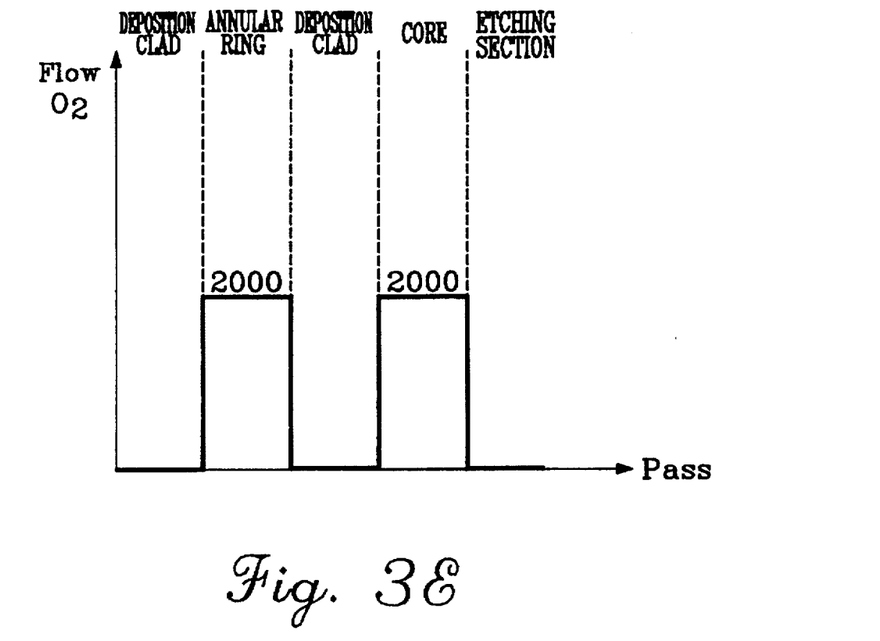
FIG. 3E shows a feed flow of $O_2$ in a fabricating process of the first optical fiber having a refractive index profile of FIG. 3A.
Figure 3F:
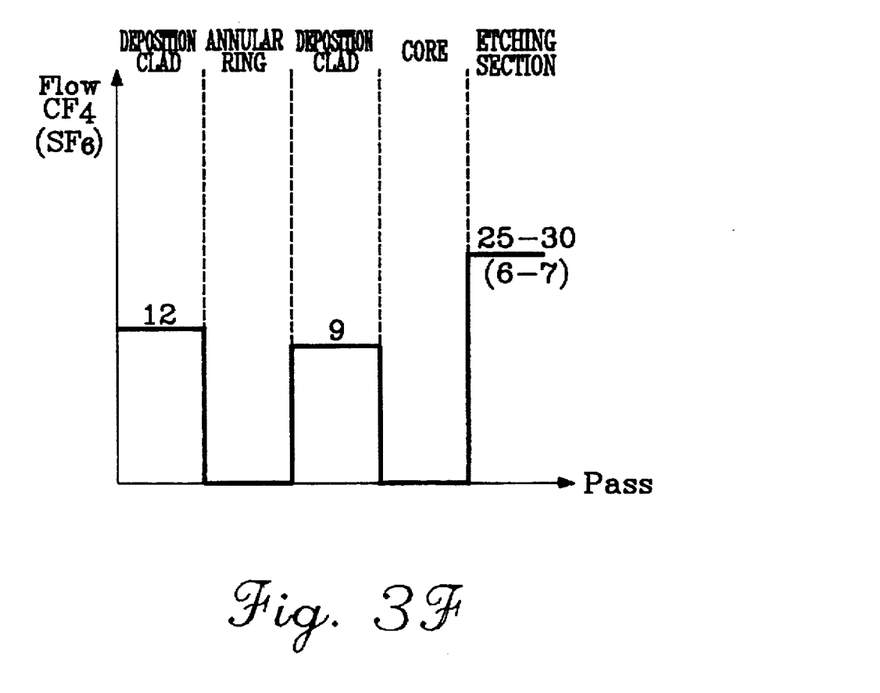
FIG. 3F shows a feed flow of $CF_4(SF_6)$ in a fabricating process of the first optical fiber having a refractive index profile of FIG. 3A.

The above optical fiber fabrication method has another problem of having much deviation in optical characteristics. When the base material is derived from a optical fiber of a small core diameter, rather than a typical single mode optical fiber, there is much deviation in optical characteristics along the length of the base material of the optical fiber, as shown in FIG. 2. As illustrated by the two insets of FIG. 2, index of refraction along a radius of the optical fiber varies. In the core section, the index does not rise gradually; the index rises and falls between the point of highest index and the point of lowest index. The indexes at points viii to I illustrate this situation. The indexes at points viii to I neither rise gradually to the core nor fall gradually from the core.

Figure 4:
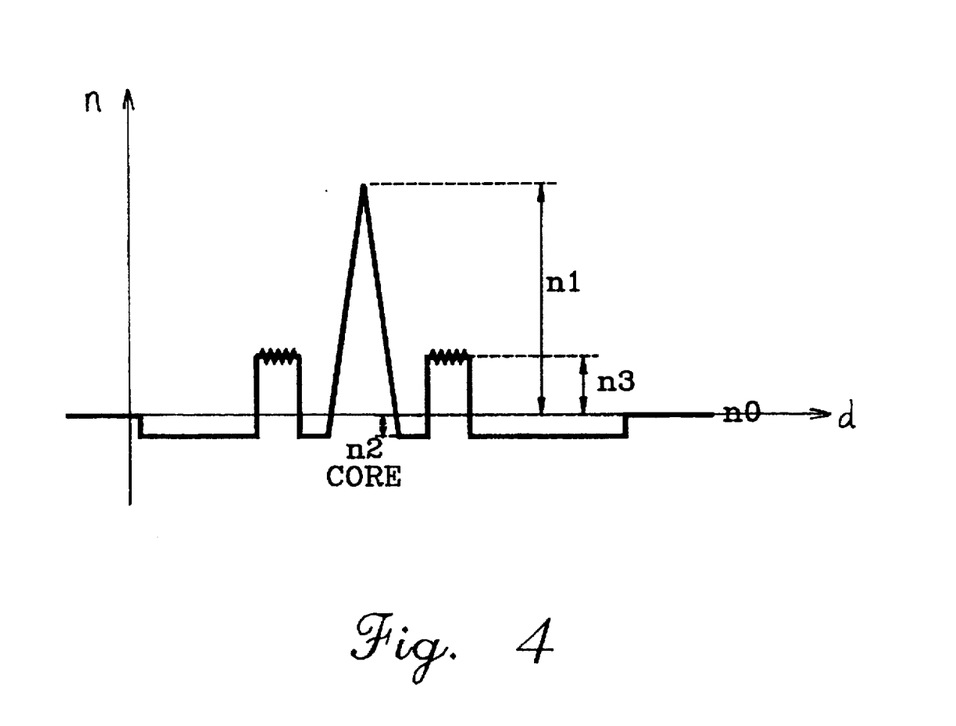
FIG. 4 is a refractive index profile of a second optical fiber made according to the principles of the present invention.
Figure 5A:
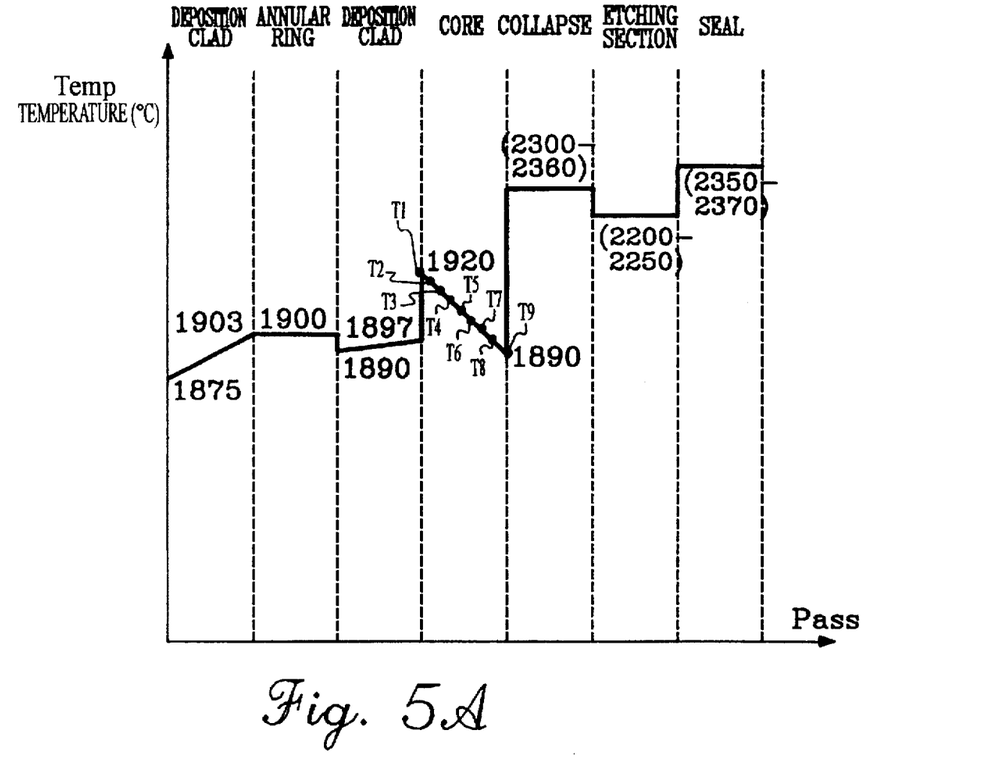
FIG. 5A shows heating temperatures at individual passes in one of the fabricating processes of the second optical fiber having the refractive index profile of FIG. 5A, the fabricating process done according to the principles of the present invention.
Figure 5B:
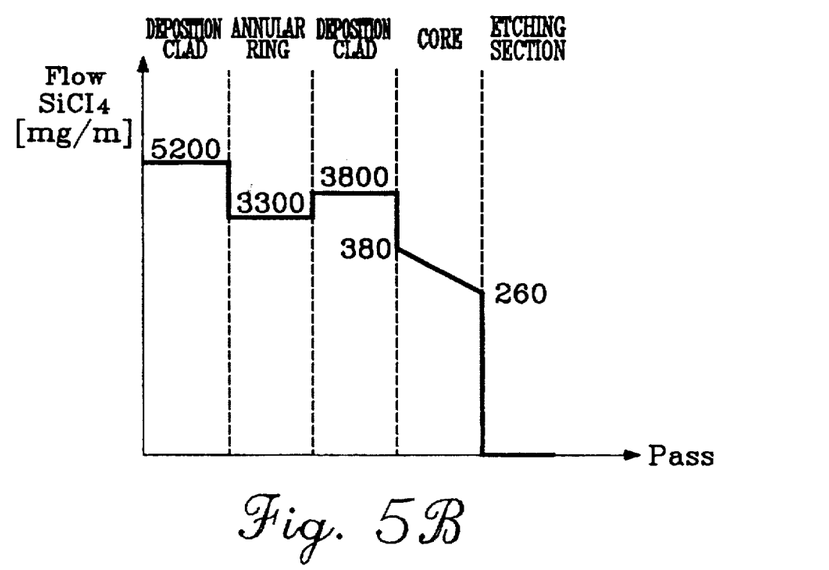
FIG. 5B shows a feed flow of $SiCl_4$ in one of the fabricating processes of the second optical fiber having a refractive index profile of FIG. 5A.
Figure 5C:
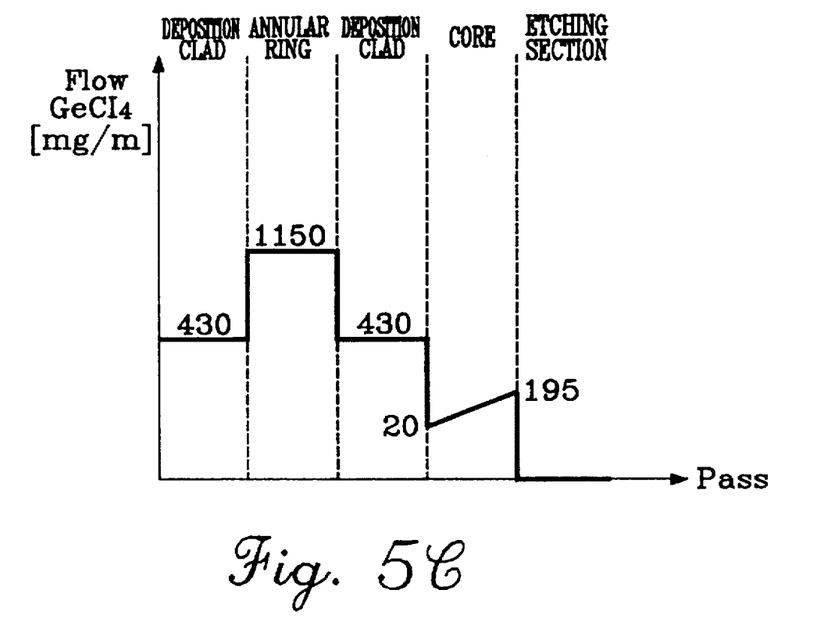
FIG. 5C shows a feed flow of $GeCl_4$ in one of the fabricating process of the second optical fiber having a refractive index profile of FIG. 5A.
Figure 5D:
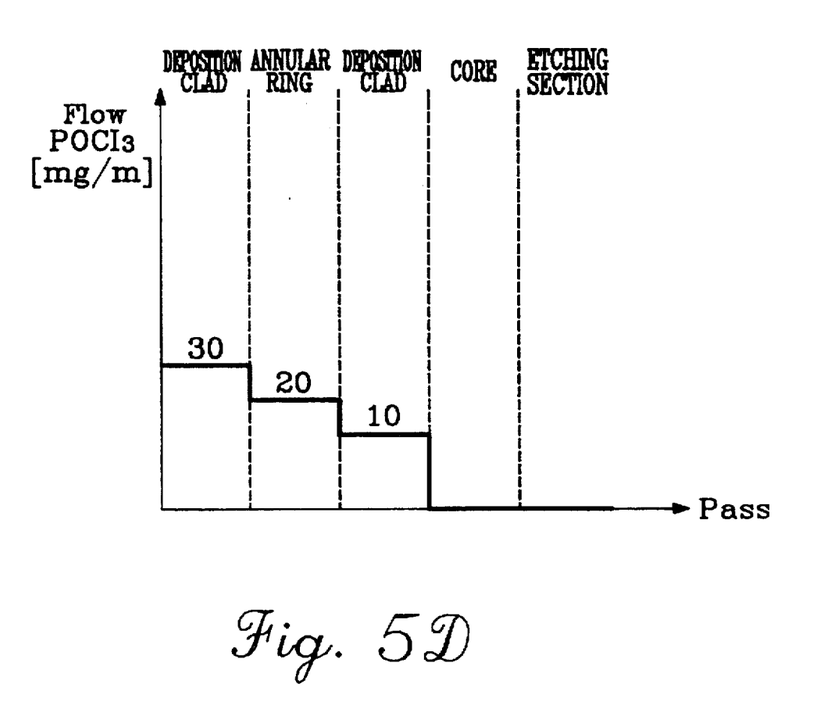
FIG. 5D shows a feed flow of $POCl_3$ in one of the fabricating process of the second optical fiber having a refractive index profile of FIG. 5A.
Figure 5E:
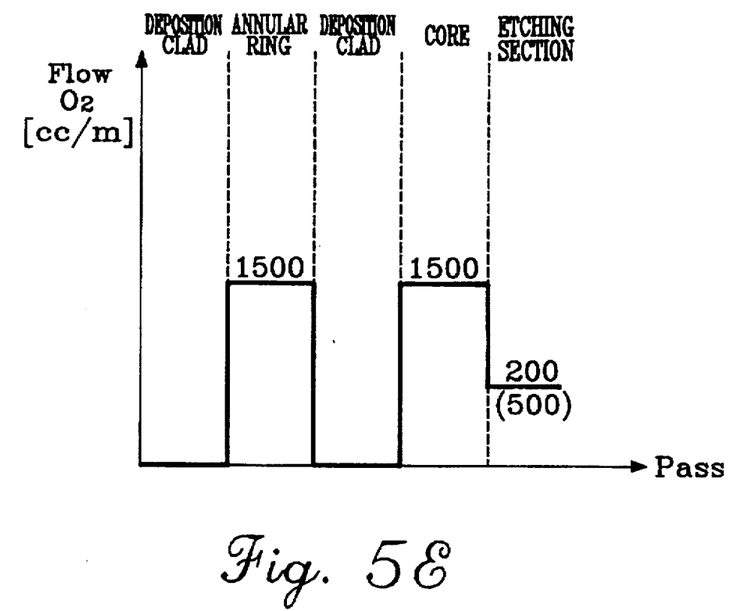
FIG. 5E shows a feed flow of $O_2$ in one of the fabricating process of the second optical fiber having a refractive index profile of FIG. 5A.

Another method is shown in FIG. 4 and FIGS. 5A–5G, in conjunction with the system shown in FIG. 1. As illustrated in FIG. 1, during heating the quartz tube 2 with a burner 8 at a constant temperature, a designated amount of raw material gas is supplied to the quartz tube 2 through a raw material gas supplier so as to fabricate the dispersion shifted optical fiber with an annular ring refractive index. In the fabricating method illustrated in FIG. 4 and FIGS. 5A–5G, the quartz tube is heated up to its surface temperature of 1875° C. for a designated time so as to make its inner surface to be uniform as in FIG. 5A. Then, as in FIGS. 5A to 5G, the quartz tube is again heated with an external oxygen hydrogen burner from 1875° C. to 1903° C. in nine passes in which the temperature increases by 3.5° C. each pass. At the same time, 5200 milligrams per minute of $SiCl_4$, 430 milligrams per minute of $GeCl_4$, 30 milligrams per minute of $POCl_3$ and 9 cubic centimeters per minute of $CF_4$ are supplied, so as to deposit a first clad. For a deposition of the annular ring section, there are supplied 3300 milligrams per minute of $SiCl_4$, 1150 milligrams per minute of $GeCl_4$, 20 milligrams per minute of $POCl_3$ and 1500 cubic centimeters per minute of $O_2$ at a constant deposition temperature of 1900° C., as in FIG. 5A. In the next step, to prepare a second clad, raw materials are supplied to the quartz tube including 3800 milligrams per minute of $SiCl_4$, 430 milligrams per minute of $GeCl_4$, 10 milligrams per minute of $POCl_3$ and 7 cubic centimeters per minute of $CF_4$ as in FIGS. 5B to 5G. These raw materials are supplied with increasing the temperature from 1890° C. to 1897° C. as in FIG. 5A. Finally, the deposition temperature is decreased from 1920° C. to 1890° C. in nine passes as illustrated in FIG. 5A, so as to deposit a core section. Meanwhile, the quantity of $SiCl_4$ feed flow decreases from 380 milligrams per minute to 260 milligrams per minute in the nine passes, the quantity of $GeCl_4$ feed flow increases from 20 milligrams per minute to 195 milligrams per minute in the nine passes, and the quantity of $O_2$ feed flow is kept constant at 1500 cubic centimeters per minute in the nine passes. In this method, the quantities of the raw materials feed flows are shown in Table 1.

TABLE 1

| PASS | 1 | 2 | 3 | 4 | 5 | 6 | 7 | 8 | 9 |
|---|---|---|---|---|---|---|---|---|---|
| $SiCl_4$ (mg/m) | 380 | 365 | 350 | 335 | 320 | 305 | 290 | 275 | 260 |
| $GeCl_4$ (mg/m) | 20 | 52 | 82 | 109 | 134 | 156 | 175 | 191 | 195 |
| T(°C.) | 1920 | 1916 | 1913 | 1909 | 1905 | 1901 | 1897 | 1894 | 1890 |

Typically, each pass takes 8 minutes and 45 seconds. A test result of the chromatic dispersion characteristics in this invention was $\lambda_o$–1550±5 nm.

Figure 5F:
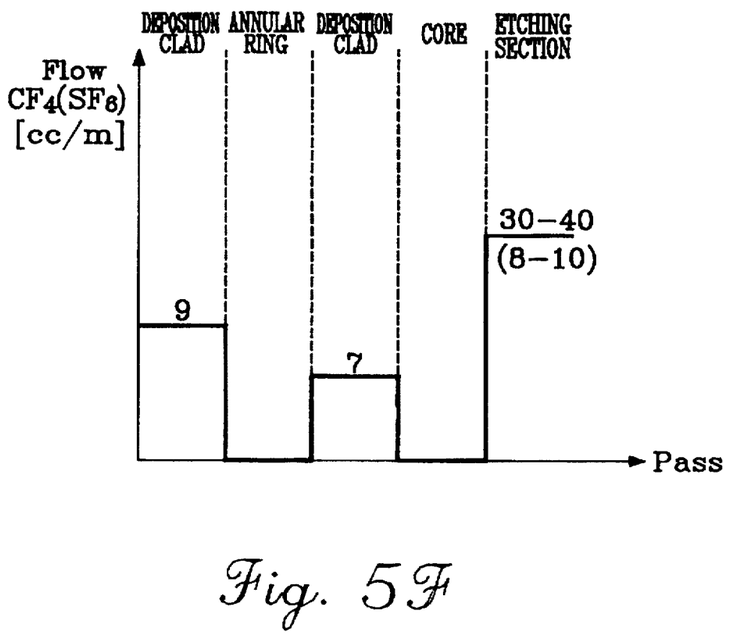
FIG. 5F shows a feed flow of $CF_4(SF_6)$ in one of the fabricating process of the second optical fiber having a refractive index profile of FIG. 5A.
Figure 5G:
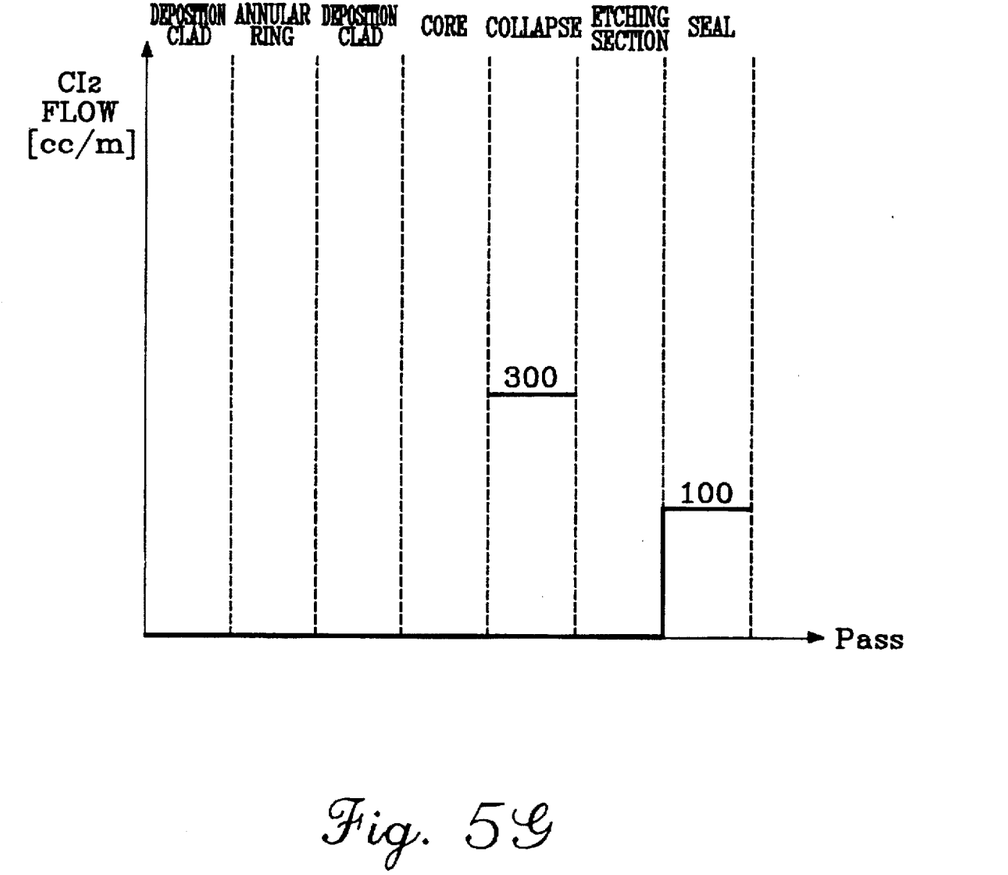
FIG. 5G shows a feed flow of $Cl_2$ in one the fabricating process of the second optical fiber having a refractive index profile of FIG. 5A.

Then, the deposition-finished culture tube is condensed at 2300° to 2360° C. as in FIG. 5A and 30 to 40 cubic centimeters per minute of $CF_4$ is added to the quartz tube as in FIG. 5F. After etching at 2220° to 2250° C., 100 cubic centimeters per minute of $Cl_2$ is supplied to the quartz tube as in FIG. 5G and heated at 2350° to 2370° C. in FIG. 5A for the purpose of seal and close.

In another embodiment of the present invention, the deposition temperature is decreased from 1905° C. to 1890° C. in nine passes so as to deposit a core section. Meanwhile, the quantity of $SiCl_4$ feed flow decreases from 300 milligrams per minute to 260 milligrams per minute in the nine passes, the quantity of $GeCl_4$ feed flow increases from 20 milligrams per minute to 195 milligrams per minute in the nine passes, and the quantity of $O_2$ feed flow is kept constant at 1500 cubic centimeters per minute in the nine passes. In this method, the quantities of the raw materials feed flow are shown in Table 2.

TABLE 2

| PASS | 1 | 2 | 3 | 4 | 5 | 6 | 7 | 8 | 9 |
|---|---|---|---|---|---|---|---|---|---|
| $SiCl_4$ (mg/m) | 300 | 295 | 296 | 285 | 280 | 275 | 270 | 265 | 260 |
| $GeCl_4$ (mg/m) | 20 | 42 | 67 | 92 | 116 | 138 | 160 | 182 | 195 |
| T(°C.) | 1905 | 1903 | 1900 | 1898 | 1895 | 1893 | 1890 | 1890 | 1890 |

In yet another embodiment of the present invention, the deposition temperature is decreased from 1905° C. to 1890° C. in nine passes so as to deposit a core section. Meanwhile, the quantity of $SiCl_4$ feed flow decreases from 300 milligrams per minute to 260 milligrams per minute in the nine passes, the quantity of $GeCl_4$ feed flow increases from 30 milligrams per minute to 195 milligrams per minute in the nine passes, and the quantity of $O_2$ feed flow keeps constant to 1500 cubic centimeters per minute in the nine passes. In this method, the quantities of the raw materials feed flow are shown in Table 3.

TABLE 3

| PASS | 1 | 2 | 3 | 4 | 5 | 6 | 7 | 8 | 9 |
|---|---|---|---|---|---|---|---|---|---|
| $SiCl_4$ (mg/m) | 300 | 295 | 290 | 285 | 280 | 275 | 270 | 265 | 260 |
| $GeCl_4$ (mg/m) | 30 | 55 | 78 | 101 | 123 | 144 | 165 | 184 | 195 |
| T(°C.) | 1905 | 1903 | 1900 | 1898 | 1895 | 1893 | 1890 | 1890 | 1890 |

As described above, the present invention provides a method of inducing a non-ripple refractive index by regulating deposition temperatures and quantities of deposition feed flows in a deposition of a base material, and by reducing a center dip. The center dip is reduced by adding a designated amount of $SF_6$ and $CF_4$ to $GeO_2$ which is volatile in the center of the core at high temperatures during a seal and close of a base material. In addition, the present invention presents a method of making a core diameter to be uniform by increasing the outer diameter of the base material, using an overclad method. This is shown at FIG. 4, with a smooth transition of refractive indexes along the core. FIG. 4 shows refractive indexes, along with representative refractive indexes Such as n0, n1, n2, and n3. n0 is an index of refraction of the first clad. n3 is an index of refraction of the annular ring. n1 is the highest index of refraction of the core section. n2 is the lowest index of refraction of the core section. The smooth transition of refractive index along the core section is in contrast to that of FIG. 2. Further, the present invention can improve the loss of optical fiber devices. The present invention has produced by practice of a chromatic dispersion that has very stable characteristics. While the foregoing examples describe alternative embodiments using a plurality of passes in which the inner surfaces of an open cylindrical tube is heated to predetermined temperatures and gaseous shape materials are introduced into the tube at specific rates of flow and are layers onto the inner surface of the tube for selected periods of time, embodiments may be fabricated in the practice of the present invention with pluralities of passes other than nine (e.g., seven, eight, ten, eleven, or more).

It should be understood that the present invention is not limited to the particular embodiment disclosed herein as the best mode contemplated for carrying out the present invention, but rather that the present invention is not limited to the specific embodiments described in this specification.

What is claimed is:

1. A method of fabricating a dispersion shifted optical fiber, comprising the steps of:

depositing a first clad by heating a quartz tube with an external burner to provide a temperature of said quartz tube increasing from 1875° C. to 1903° C. while supplying said quartz tube with raw materials including feed flow quantities of 5200 milligrams per minute of $SiCl_4$, 430 milligrams per minute of $GeCl_4$, 30 milligrams per minute of $POCl_3$ and 9 cubic centimeters per minute of $CF_4$;

depositing an annular ring section by supplying raw materials including feed flow quantities of 3300 milligrams per minute of $SiCl_4$, 1150 milligrams per minute of $GeCl_4$, 20 milligrams per minute of $POCl_3$ and 1500 cubic centimeters per minute of $O_2$ while maintaining said temperature of said quartz tube at about a constant temperature of 1900° C.;

depositing a second clad by supplying raw materials including feed flow quantities of 3800 milligrams per minute of $SiCl_4$, 430 milligrams per minute of $GeCl_4$, 10 milligrams per minute of $POCl_3$ and 7 cubic centimeters per minute of $CF_4$ while heating said quartz tube to increase said temperature of said quartz tube from 1890° C. to 1897° C.;

depositing a core section by heating said quartz tube in nine temperature-deceasing passes to provide said temperature at 1920° C., 1916° C., 1913° C., 1909° C., 1906° C., 1901° C., 1897° C., 1894° C., and 1890° C., respectively, while supplying $SiCl_4$ with respectively decreasing feed flow quantities of 380 milligrams per minute, 365 milligrams per minute, 350 milligrams per minute, 335 milligrams per minute, 320 milligrams per minute, 305 milligrams per minute, 290 milligrams per minute, 275 milligrams per minute, and 260 milligrams per minute in said nine passes, by supplying $GeCl_4$ with feed flow quantities of respectively 20 milligrams per minute, 52 milligrams per minute, 82 milligrams per minute, 109 milligrams per minute, 134 milligrams per minute, 156 milligrams per minute, 175 milligrams per minute, 191 milligrams per minute, and 195 milligrams per minute in said nine passes, and by supplying $O_2$ at a constant feed flow of 1500 cubic centimeters per minute in said nine passes;

condensing said quartz tube by heating said quartz tube to provide said temperature in a temperature range from 2300° to 2360° C.

while supplying $CF_4$ at a feed flow from a range from 30 cubic centimeters per minute to 40 cubic centimeters per minute of $CF_4$, to said quartz tube;

etching by heating said quartz tube to provide said temperature in a temperature range from 2220° to 2250° C.; and sealing by supplying 100 cubic centimeters per minute of $Cl_2$ to said quartz tube while heating said quartz tube to provide said temperature in a temperature range from 2350° to 2370° C.

2. A method of fabricating a dispersion shifted optical fiber, comprising the steps of:

depositing a first clad by heating a quartz tube with an external burner to provide a temperature of said quartz tube in a temperature range of from about 1875° C. to about 1903° C. while supplying said quartz tube with raw materials including feed flow quantities of about 5200 milligrams per minute of $SiCl_4$, about 430 milligrams per minute of $GeCl_4$, about 30 milligrams per minute of $POCl_3$ and about 9 cubic centimeters per minute of $CF_4$;

depositing an annular ring section by supplying raw materials including feed flow quantities of about 3300 milligrams per minute of $SiCl_4$, about 1150 milligrams per minute of $GeCl_4$, about 20 milligrams per minute of $POCl_3$ and about 1500 cubic centimeters per minute of $O_2$ while heating said quartz tube to provide said temperature at about a constant temperature of 1900° C.;

depositing a second clad by supplying raw materials including feed flow quantities of about 3800 milligrams per minute of $SiCl_4$, about 430 milligrams per minute of $GeCl_4$, about 10 milligrams per minute of $POCl_3$ and about 7 cubic centimeters per minute of $CF_4$ while heating said quartz tube to increase said temperature from about 1890° C. to about 1897° C.;

depositing a core section by heating said quartz tube in nine passes to provide said temperature at a series of nine decreasing temperatures, while supplying $SiCl_4$ with decreasing feed flow quantities in said nine passes, by supplying $GeCl_4$ with increasing feed flow quantities in said nine passes, and supplying $O_2$ at a constant feed flow of about 1500 cubic centimeters per minute in said nine passes;

condensing by heating said quartz tube to provide said temperature in a temperature range from about 2300° to about 2360° C.

while supplying $CF_4$ with a feed flow quantity in a range from about 30 cubic centimeters per minute to about 40 cubic centimeters per minute of $CF_4$, to said quartz tube;

etching at a temperature range from about 2220° to about 2250° C.; and sealing by supplying about 100 cubic centimeters per minute of $Cl_2$ while heating said quartz tube to provide said temperature in a temperature range from about 2350° to about 2370° C.

3. A method of fabricating a dispersion shifted optical fiber, comprising the steps of:

depositing a first clad by heating a quartz tube with an external burner to provide a temperature of said quartz tube in a range from about 1875° C. to about 1903° C. while supplying said quartz tube with raw materials including $SiCl_4$, $GeCl_4$, $POCl_3$, and $CF_4$;

depositing an annular ring section by supplying raw materials including $SiCl_4$, $GeCl_4$, $POCl_3$, and $O_2$;

depositing a second clad by supplying raw materials including $SiCl_4$, $GeCl_4$, $POCl_3$ and $CF_4$ while heating said quartz tube to provide said temperature in a temperature range from about 1890° C. to about 1897° C.;

depositing a core section by heating said quartz tube in a plurality of passes to provide said temperature at a decreasing series of temperatures, while supplying $SiCl_4$ at differing feed flow quantities in said plurality of passes, supplying $GeCl_4$ at differing feed flow quantities in said plurality of passes, and supplying $O_2$ at about constant feed flow quantity in said plurality of passes;

condensing by heating said quartz tube to provide said temperature in a temperature range from about 2300° to about 2360° C. while supplying $CF_4$ at a flow feed quantity in a range from about 30 cubic centimeters per minute to about 40 cubic centimeters per minute of $CF_4$ to said quartz tube;

etching at a temperature range from about 2220° to about 2250° C.; and supplying $Cl_2$ while heating said quartz tube to provide said temperature in a temperature range from about 2350° to about 2370° C.

4. The method of claim 3, wherein said burner is an oxygen and hydrogen burner.

5. The method of claim 3, wherein said plurality of passes consists of nine passes.

6. The method of claim 5, wherein during the step of depositing said core section, each one of said decreasing series of temperatures is in a range of temperatures from about 1920° C. to about 1890° C., the quantity of $SiCl_4$ feed flow decreases from about 380 milligrams per minute to about 260 milligrams per minute in said nine passes, the quantity of $GeCl_4$ feed flow increases from about 20 milligrams per minute to about 195 milligrams per minute in said nine passes, and the quantity of $O_2$ feed flow stays constant at about 1500 cubic centimeters per minute in said nine passes.

7. The method of claim 6, wherein during the step of depositing said core section, said decreasing series of temperatures includes about 1920° C., about 1916° C., about 1913° C., about 1909° C., about 1906° C., about 1901° C., about 1897° C., about 1894° C. and about 1890° C., said quantity of $SiCl_4$ feed flow has flow rates in said nine passes of about 380 milligrams per minute, about 365 milligrams per minute, about 350 milligrams per minute, about 335 milligrams per minute, about 320 milligrams per minute, about 305 milligrams per minute, about 290 milligrams per minute, about 275 milligrams per minute, and about 260 milligrams per minute, respectively; and said quantity of $GeCl_4$ feed flow has flow rates in said nine passes of about 20 milligrams per minute, about 52 milligrams per minute, about 82 milligrams per minute, about 109 milligrams per minute, about 134 milligrams per minute, about 156 milligrams per minute, about 175 milligrams per minute, about 191 milligrams per minute, and about 195 milligrams per minute, respectively.

8. The method of claim 5, wherein during the step of depositing said core section, each one of, said decreasing series of temperatures is in a range of temperatures from about 1920° C. to about 1890° C., the quantity of $SiCl_4$ feed flow decreases from about 380 milligrams per minute to about 260 milligrams per minute in said nine passes, the quantity of $GeCl_4$ feed flow increases from about 20 milligrams per minute to about 194 milligrams per minute in said nine passes, and the quantity of $O_2$ feed flow stays constant at about 1500 cubic centimeters per minute in said nine passes.

9. The method of claim 8, wherein during the step of depositing said core section, said decreasing series temperatures includes 1920° C., about 1916° C., about 1913° C., about 1909° C., about 1906° C., about 1901° C., about 1897° C., about 1894° C., and about 1890° C.; said quantity of $SiCl_4$ feed flow has flow rates in said nine passes of about 380 milligrams per minute, about 365 milligrams per minute, about 350 milligrams per minute, about 335 milligrams per minute, about 320 milligrams per minute, about 305 milligrams per minute, about 290 milligrams per minute, about 275 milligrams per minute, and about 260 milligrams per minute, respectively; and said quantity of $GeCl_4$ feed flow has flow rates in said nine passes of about 20 milligrams per minute, about 52 milligrams per minute, about 82 milligrams per minute, about 109 milligrams per minute, about 134 milligrams per minute, about 156 milligrams per minute, about 175 milligrams per minute, about 191 milligrams per minute, and about 194 milligrams per minute, respectively.

10. The method of claim 5, wherein during the step of depositing said core section, each one of said decreasing series of temperatures is in a range of temperatures of from about 1905° C. to about 1890° C., the quantity of $SiCl_4$ feed flow decreases from about 300 milligrams per minute to about 260 milligrams per minute in said nine passes, the quantity of $GeCl_4$ feed flow increases from about 20 milligrams per minute to about 195 milligrams per minute in said nine passes, the quantity of $O_2$ feed flow stays constant at about 200 milligrams per minute in said nine passes.

11. The method of claim 5, wherein during the step of depositing said core section, each one of said decreasing series of temperatures is in a temperature range of from about 1905° C. to about 1890° C., the quantity of $SiCl_4$ feed flow decreases from about 300 milligrams per minute to about 260 milligrams per minute in said nine passes, the quantity of $GeCl_4$ feed flow increases from about 20 milligrams per minute to about 195 milligrams per minute in said nine passes, and the quantity of $O_2$ feed flow stays constant at about 1500 cubic centimeters per minute in said nine passes.

12. The method of claim 11, wherein during the step of depositing said core section, said decreasing series of temperatures includes about 1905° C., about 1903° C., about 1900° C., about 1898° C., about 1895° C., about 1893° C., about 1890° C., about 1890° C. and about 1890° C.; said quantity of $SiCl_4$ feed flow has flow rates in said nine passes of about 300 milligrams per minute, about 295 milligrams per minute, about 290 milligrams per minute, about 285 milligrams per minute, about 280 milligrams per minute, about 275 milligrams per minute, about 270 milligrams per minute, about 265 milligrams per minute and about 260 milligrams per minute, respectively; and said quantity of $GeCl_4$ feed flow has flow rates in said nine passes of about 20 milligrams per minute, about 42 milligrams per minute, about 67 milligrams per minute, about 92 milligrams per minute, about 116 milligrams per minute, about 138 milligrams per minute, about 160 milligrams per minute, about 182 milligrams per minute, and about 195 milligrams per minute, respectively.

13. The method of claim 5, wherein during the step of depositing said core section, each one of said decreasing series of temperatures is in a temperature range of from about 1905° C. to about 1890° C., the quantity of $SiCl_4$ feed flow decreases from about 300 milligrams per minute to about 260 milligrams per minute in said nine passes, the quantity of $GeCl_4$ feed flow increases from about 30 milligrams per minute to about 195 milligrams per minute in said nine passes, and the quantity of $O_2$ feed flow remains constant at about 1,500 cubic centimeters per minute in said nine passes.

14. The method of claim 13, wherein during the step of depositing said core section, said decreasing series of temperatures includes about 1905° C., about 1903° C., about 1900° C., about 1898° C., about 1895° C., about 1893° C., about 1890° C., about 1890° C. and about 1890° C.; said quantity of $SiCl_4$ feed flow has flow rates of about 300 milligrams per minute, about 295 milligrams per minute, about 290 milligrams per minute, about 285 milligrams per minute, about 280 milligrams per minute, about 275 milligrams per minute, about 270 milligrams per minute, about 265 milligrams per minute and about 260 milligrams per minute in said nine passes, respectively; and said quantity of $GeCl_4$ feed flow has flow rates of about 30 milligrams per minute, about 55 milligrams per minute, about 78 milligrams per minute, about 101 milligrams per minute, about 123 milligrams per minute, about 144 milligrams per minute, about 165 milligrams per minute, about 184 milligrams per minute, and about 195 milligrams per minute in said nine passes, respectively.

15. The method of claim 5, wherein said step of supplying $Cl_2$ to said quartz tube includes sealing and closing said quartz tube.

16. The method of claim 3, wherein during the step of depositing said first clad, raw materials including feed flow quantities of about 5200 milligrams per minute of $SiCl_4$, about 430 milligrams per minute of $GeCl_4$, about 30 milligrams per minute of $POCl_3$ and about 9 cubic centimeters per minute of $CF_4$ are supplied to said quartz tube, while heating said quartz tube to provide said temperature in a temperature range of from about 1875° C. to about 1903° C.

17. The method of claim 3, wherein during the step of depositing said annular ring section, raw materials including feed flow quantities of about 3300 milligrams per minute of $SiCl_4$, about 1150 milligrams per minute of $GeCl_4$, about 20 milligrams per minute of $POCl_3$ and about 1500 cubic centimeters per minute of $O_2$ are supplied while heating said quartz tube to provide said temperature at about a constant temperature of 1900° C.

18. The method of claim 5, wherein during the step of depositing said second clad, raw materials including feed flow quantities of about 3800 milligrams per minute of $SiCl_4$, about 430 milligrams per minute of $GeCl_4$, about 10 milligrams per minute of $POCl_3$ and about 7 cubic centimeters per minute of $CF_4$ are supplied while heating said quartz tube to provide said temperature at successively increasing temperatures in a temperature range of from about 1890° C. to about 1897° C.

19. The method of claim 3, wherein during the step of supplying $Cl_2$ to said quartz tube, about 100 cubic centimeters per minute of $Cl_2$ are supplied.

20. An optical fiber for lightwave communications, comprising:
 a first clad layer; and
 a core section disposed inside said first clad layer and including
  a central axis,
  an external interface disposed at a first radial distance $R_1$ from said central axis, and
  a plurality of deposited glass layers disposed concentrically about said central axis and including an innermost layer adjacent to said central axis and an external layer adjacent to said external interface, with each deposited glass layer having a corresponding layer refractive index;
 and wherein said core section has a core refractive index varying in accordance with a core refractive index profile providing a core refractive index value for each radial distance from said central axis not exceeding said first radial distance $R_1$, with said core refractive index profile exhibiting, for each first and second deposited glass layers included in said plurality of deposited glass layers and adjacent to each other, a smooth transition between said layer refractive index of said first layer and said layer refractive index of said second layer.

21. The optical fiber of claim 20, wherein the optical fiber is fabricated using a method comprising the steps of:
 depositing said first clad by heating a quartz tube with an external burner and by supplying said quartz tube with raw materials including $SiCl_4$, $GeCl_4$, $POCl_3$ and $CF_4$;
 depositing said core section by heating said quartz tube in a plurality of passes to provide a temperature of said quartz tube at a decreasing series of temperatures while supplying $SiCl_4$ at specified feed flow quantities in said plurality of passes, supplying $GeCl_4$ at specified feed flow quantities in said plurality of passes, and supplying $O_2$ at about a constant feed flow quantity in said plurality of passes;
 condensing said quartz tube; and
 sealing and closing.

22. The method of claim 3, wherein said optical fiber has an annular ring refractive index profile continuously graduated along a radius of said optical fiber.

23. The method of claim 3, wherein said optical fiber has a core section refractive index profile continuously upwardly graduated along a radius of said optical fiber.

24. The method of claim 23, wherein said refractive index profile in said core section has a constant gradient along said radius of said optical fiber.

25. The method of claim 23, wherein a refractive index in a portion of said core section is less than a refractive index of said first clad layer.

26. The method of claim 23, wherein a refractive index in a portion of said core section is less than a refractive index of said annular ring.

27. The optical fiber of claim 20, further comprising an annular ring section disposed as a layer external to said core section and having:

an inner interface disposed at a second radial distance $R_2$ from said central axis, with $R_1 \leq R_2$;

an outer interface disposed at a third radial distance $R_3$ from said central axis, with $R_2 < R_3$; and an annular ring refractive index varying in accordance with an annular ring refractive index profile providing a ring refractive index value for each radial distance from said central axis at least equal to said second radial distance and not exceeding said third radial distance.

28. The optical fiber of claim 27, wherein:

said annular ring refractive index profile provides a maximum ring refractive index value $I_{Rmax}$ at a fourth radial distance $R_4$ from said central axis, with $R_2 \leq R_4 \leq R_3$; and said core refractive index profile provides a maximum core refractive index value $I_{Cmax}$ at said central axis and exhibits from said central axis to an extremal distance $R_E$ a continuous and constant rate of decrease in said core refractive index value as a function of radial distance from said central axis, with $R_E \leq R_1$.

29. The optical fiber of claim 20, wherein:

said core refractive index profile provides a maximum core refractive index value $I_{Cmax}$ at said central axis and exhibits from said central axis to to an extremal distance $R_E$ a continuous and constant rate of decrease in core refractive index value as a function of radial distance from said central axis, with $R_E \leq R_1$.

30. The optical fiber of claim 27 wherein $R_1 = R_2$, whereby said annular ring section is contiguous with said core section and said inner interface of said annular ring section coincides with said external interface of said core section.

31. The optical fiber of claim 27, further comprising a second clad layer interposed between said core section and said annular ring section, and wherein:

said second clad layer is contiguous with said core section at said external interface of said core section; and said second clad layer is contiguous with said annular ring section at said inner interface of said annular ring section.

32. The optical fiber of claim 30, wherein:

said annular ring refractive index profile provides a maximum ring refractive index value $I_{Rmax}$ at a fourth radial distance $R_4$ from said central axis, with $R_1 < R_4 \leq R_3$; and said core refractive index profile provides a maximum core refractive index value $I_{Cmax}$ at said central axis and exhibits from said central axis to an extremal radial distance $R_E$ a continuous and constant rate of decrease in said core refractive index value as a function of radial distance from said central axis, with $R_E$ satisfying $R_E \leq R_1$.

33. The optical fiber of claim 32, wherein:

said core refractive index profile provides a minimum core refractive index value $I_{Cmin}$ at said extremal radial distance $R_E$, with $I_{Cmin}$ satisfying $I_{Cmin} < I_{Rmax}$.

34. The optical fiber of claim 32, wherein $I_{Cmax} > I_{Rmax}$.

35. The optical fiber of claim of 30, wherein:

said annular ring refractive index profile provides a maximum ring refractive index value $I_{Rmax}$ at a fourth radial distance $R_4$ from said central axis, with $R_1 < R_4 \leq R_3$; and said core refractive index profile provides a maximum core refractive index value $I_{Cmax}$ at said central axis and exhibits from said central axis to an extremal radial distance $R_E$ a monotonic decrease in said core refractive index value as a function of radial distance from said central axis, with $R_E$ satisfying $R_E \leq R_1$.

36. The optical fiber of claim 35, wherein:

said core refractive index profile provides a minimum core refractive index value $I_{Cmin}$ at said extremal radial distance $R_E$, with $I_{Cmin}$ satisfying $I_{Cmin} < I_{Rmax}$.

37. The optical fiber of claim 21, wherein said raw materials are moved from containers to said quartz tube through a vapor carrier system.

38. The optical fiber of claim 21, wherein said external burner is an oxygen and hydrogen burner.

39. A method of fabricating an optical fiber for lightwave communications, comprising the steps of:

depositing a first clad by heating a quartz tube with an external burner to provide a temperature of said quartz tube in a range from about 1875° C. to about 1903° C. while supplying said quartz tube with raw materials including $SiCl_4$, $GeCl_4$, $POCl_3$, and $CF_4$;

depositing a core section by heating said quartz tube in a plurality of passes to provide said temperature at a decreasing series of temperatures, while supplying $SiCl_4$ at differing feed flow quantities in said plurality of passes, supplying $GeCl_4$ at differing feed flow quantities in said plurality of passes, and supplying $O_2$ at about constant feed flow quantity in said plurality of passes; and condensing by heating said quartz tube to provide said temperature in a temperature range from about 2300° to about 2360° C. while supplying $CF_4$ at a flow feed quantity in a range from about 30 cubic centimeters per minute to about 40 cubic centimeters per minute of $CF_4$ to said quartz tube.

40. The method of claim 39, wherein said plurality of passes consists of nine passes.

41. The method of claim 40, wherein during said step of depositing said core section, each one of said decreasing series of temperatures is in a range of temperatures from about 1920° C. to about 1890° C., the quantity of $SiCl_4$ feed flow decreases from about 380 milligrams per minute to about 260 milligrams per minute in said nine passes, the quantity of $GeCl_4$ feed flow increases from about 20 milligrams per minute to about 195 milligrams per minute in said nine passes, and the quantity of $O_2$ feed flow stays constant at about 1500 cubic centimeters per minute in said nine passes.

42. The method of claim 41, wherein during said step of depositing said core section:

said decreasing series of temperatures includes about 1920° C., about 1916° C., about 1913° C., about 1909° C., about 1906° C., about 1901° C., about 1897° C., about 1894° C. and about 1890° C.;

said quantity of $SiCl_4$ feed flow has flow rates in said nine passes of about 380 milligrams per minute, about 365 milligrams per minute, about 350 milligrams per minute, about 335 milligrams per minute, about 320 milligrams per minute, about 305 milligrams per minute, about 290 milligrams per minute, about 275 milligrams per minute, and about 260 milligrams per minute, respectively; and said quantity of GeCl$_4$ feed flow has flow rates in said nine passes of about 20 milligrams per minute, about 52 milligrams per minute, about 82 milligrams per minute, about 109 milligrams per minute, about 134 milligrams per minute, about 156 milligrams per minute, about 175 milligrams per minute, about 191 milligrams per minute, and about 195 milligrams per minute, respectively.

43. The method of claim 5, wherein during the step of depositing a core section by heating in nine passes of decreasing temperatures, said decreasing temperatures are from a range of temperatures from about 1920° C. to about 1890° C. in said nine passes, the quantity of SiCl$_4$ feed flow decreases from about 380 milligrams per minute to about 260 milligrams per minute in said nine passes, the quantity of GeCl$_4$ feed flow increases from about 20 milligrams per minute to about 194 milligrams per minute in said nine passes, and the quantity of O$_2$ feed flow stays constant at about 1500 cubic centimeters per minute in said nine passes.

44. The method of claim 43, wherein during the step of depositing said core section:

said decreasing series of temperatures includes about 1920° C., about 1916° C., about 1913° C., about 1909° C., about 1906° C., about 1901° C., about 1897° C., about 1894° C., and about 1890° C.;

said quantity of SiCl$_4$ feed flow has flow rates in said nine passes of about 380 milligrams per minute, about 365 milligrams per minute, about 350 milligrams per minute, about 335 milligrams per minute, about 320 milligrams per minute, about 305 milligrams per minute, about 290 milligrams per minute, about 275 milligrams per minute, and about 260 milligrams per minute, respectively; and said quantity of GeCl$_4$ feed flow has flow rates in said nine passes of about 20 milligrams per minute, about 52 milligrams per minute, about 82 milligrams per minute, about 109 milligrams per minute, about 134 milligrams per minute, about 156 milligrams per minute, about 175 milligrams per minute, about 191 milligrams per minute, and about 194 milligrams per minute, respectively.

45. The method of claim 40, wherein during the step of depositing said core section, each one of said decreasing series of temperatures is in a range of temperatures of from about 1905° C. to about 1890° C., the quantity of SiCl$_4$ feed flow decreases from about 300 milligrams per minute to about 260 milligrams per minute in said nine passes, the quantity of GeCl$_4$ feed flow increases from about 20 milligrams per minute to about 195 milligrams per minute in said nine passes, the quantity of O$_2$ feed flow stays constant at about 200 milligrams per minute in said nine passes.

46. The method of claim 40, wherein during the step of depositing said core section, each one of said decreasing series of temperatures is in a temperature range of from about 1905° C. to about 1890° C., the quantity of SiCl$_4$ feed flow decreases from about 300 milligrams per minute to about 260 milligrams per minute in said nine passes, the quantity of GeCl$_4$ feed flow increases from about 20 milligrams per minute to about 195 milligrams per minute in said nine passes, and the quantity of O$_2$ feed flow stays constant at about 1500 cubic centimeters per minute in said nine passes.

47. The method of claim 46, wherein during the step of depositing said core section:

said decreasing series of temperatures includes about 1905° C., about 1903° C., about 1900° C., about 1898° C., about 1895° C., about 1893° C., about 1890° C., about 1890° C. and about 1890° C.;

said quantity of SiCl$_4$ feed flow has flow rates in said nine passes of about 300 milligrams per minute, about 295 milligrams per minute, about 290 milligrams per minute, about 285 milligrams per minute, about 280 milligrams per minute, about 275 milligrams per minute, about 270 milligrams per minute, about 265 milligrams per minute and about 260 milligrams per minute, respectively; and said quantity of GeCl$_4$ feed flow has flow rates in said nine passes of about 20 milligrams per minute, about 42 milligrams per minute, about 67 milligrams per minute, about 92 milligrams per minute, about 116 milligrams per minute, about 138 milligrams per minute, about 160 milligrams per minute, about 182 milligrams per minute, and about 195 milligrams per minute, respectively.

48. The method of claim 40, wherein during the step of depositing said core section, each one of said decreasing series of temperatures is in a temperature range of from about 1905° C. to about 1890° C., the quantity of SiCl$_4$ feed flow decreases from about 300 milligrams per minute to about 260 milligrams per minute in said nine passes, the quantity of GeCl$_4$ feed flow increases from about 30 milligrams per minute to about 195 milligrams per minute in said nine passes, and the quantity of O$_2$ feed flow remains constant at about 1,500 cubic centimeters per minute in said nine passes.

49. The method of claim 48, wherein during the step of depositing said core section:

said decreasing series of temperatures includes about 1905° C., about 1903° C., about 1900° C., about 1898° C., about 1895° C., about 1893° C., about 1890° C., about 1890° C. and about 1890° C.;

said quantity of SiCl$_4$ feed flow has flow rates of about 300 milligrams per minute, about 295 milligrams per minute, about 290 milligrams per minute, about 285 milligrams per minute, about 280 milligrams per minute, about 275 milligrams per minute, about 270 milligrams per minute, about 265 milligrams per minute and about 260 milligrams per minute in said nine passes, respectively; and said quantity of GeCl$_4$ feed flow has flow rates of about 30 milligrams per minute, about 55 milligrams per minute, about 78 milligrams per minute, about 101 milligrams per minute, about 123 milligrams per minute, about 144 milligrams per minute, about 165 milligrams per minute, about 184 milligrams per minute, and about 195 milligrams per minute in said nine passes, respectively.

50. The method of claim 40, wherein said step of supplying Cl$_2$ to said quartz tube includes sealing and closing said quartz tube.

51. The method of claim 39, wherein during the step of depositing said first clad, raw materials including feed flow quantities of about 5200 milligrams per minute of SiCl$_4$, about 430 milligrams per minute of GeCl$_4$, about 30 milligrams per minute of POCl$_3$ and about 9 cubic centimeters per minute of CF$_4$ are supplied to said quartz tube while heating said quartz tube to provide said temperature in a temperature range of from about 1875° C. to about 1903° C.

52. The method of claim 39, wherein during the step of supplying Cl$_2$ to said quartz tube, about 100 cubic centimeters per minute of Cl$_2$ are supplied.

53. The optical fiber of claim 20, wherein the optical fiber is fabricated using a method comprising the steps of:

depositing said first clad by heating a quartz tube with an external burner and by supplying said quartz tube with raw materials including $SiCl_4$, $GeCl_4$, $POCl_3$, and $CF_4$;

depositing said core section by heating said quartz tube in a plurality of passes to provide a temperature of said quartz tube at each on of a decreasing series of temperatures while supplying $SiCl_4$ at a specified feed flow quantity for each one of said plurality of passes, supplying $GeCl_4$ at a specified feed flow quantity for each one of said plurality of passes, and supplying $O_2$ at about a constant feed flow quantity for each one of said plurality of passes;

condensing said quartz tube; and sealing and closing.

54. The optical fiber of claim 51, wherein the optical fiber is fabricated using a method comprising the steps of:

depositing said first clad by heating a quartz tube with an external burner and by supplying said quartz tube with raw materials including $SiCl_4$, $GeCl_4$, $POCl_3$, and $CF_4$;

depositing said annular ring section by supplying raw materials including $SiCl_4$, $GeCl_4$, $POCl_3$, and $O_2$;

depositing said second clad by supplying raw materials including $SiCl_4$, $GeCl_4$, $POCl_3$ and $CF_4$;

depositing said core section by heating said quartz tube in a plurality of passes to provide a temperature of said quartz tube at a decreasing series of temperatures while supplying $SiCl_4$ at specified feed flow quantities in said plurality of passes, supplying $GeCl_4$ at specified feed flow quantities in said plurality of passes, and supplying $O_2$ at about a constant feed flow quantity in said plurality of passes;

condensing said quartz tube; and sealing and closing.

* * * * *